UNITED STATES PATENT OFFICE.

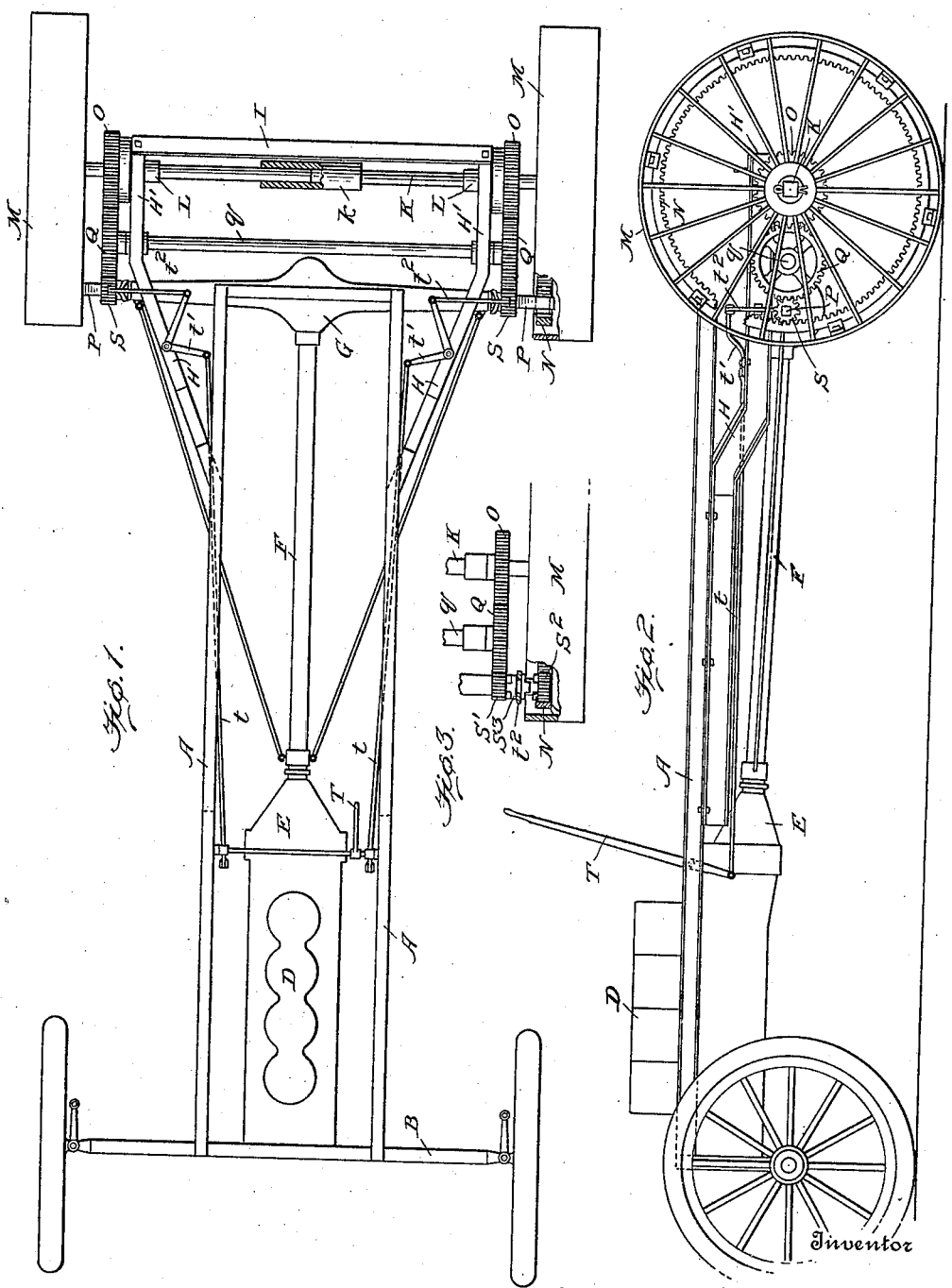

WILLIAM J. MILLER, OF BEAUMONT, TEXAS.

CHANGE-SPEED MECHANISM FOR TRACTOR-TRUCK MOTOR-VEHICLES.

1,320,263.	Specification of Letters Patent.	Patented Oct. 28, 1919.

Application filed July 8, 1918. Serial No. 243,835.

*To all whom it may concern:*

Be it known that I, WILLIAM J. MILLER, a citizen of the United States, residing at Beaumont, in the county of Jefferson and State of Texas, have invented certain new and useful Improvements in Change-Speed Mechanism for Tractor-Truck Motor-Vehicles; and I do hereby declare the following to be a full, clear, and exact description of the same, reference being had to the accompanying drawings, forming part of this specification.

The present invention has for its object the production of a motor vehicle which is well adapted for use either as a tractor for farm work or as a truck for traveling over highways at a rate of speed and with the power required for both classes of work. In the vehicle adopted for illustrating the invention, an automobile frame and power plant are shown in a conventional manner and the tractor-truck mechanism constitutes an extension or enlargement thereof; the latter mechanism in itself consisting in a broad sense of what might be termed a supplemental frame having a rear axle mounted therein for supporting the load and carrying the ground or traction wheels, which latter are of broad tread with a sufficient tire area to adapt them for either class of work. Forward of said axle said supplemental frame carries an intermediate or sectional drive shaft having a differential therein in accord with customary rear axle practice, and adapted to transmit its power to the traction wheels through one or the other of two trains of gearing, consisting essentially of internally toothed gear wheels on the traction wheels with which pinions on the intermediate drive shaft may directly mesh and of trains of spur gears for transmitting the power of the intermediate drive shaft to the traction wheels through an externally toothed gear wheel concentric with the axle of the traction wheels, and a shifting mechanism or clutch for transferring the driving connections from one train to the other, whereby, by a simple shifting operation the vehicle may be converted into a tractor in which the power will be transmitted to the internally toothed gear wheel, or into a truck wherein the power is transmitted from the intermediate drive shaft through the externally toothed gear wheel.

Referring to the accompanying drawings,—

Figure 1 is a top plan view of a tractor-truck motor vehicle embodying the present improvement, certain of the parts being diagrammatically and conventionally shown where preferably made of standard or known construction;

Fig. 2 is a side elevation of the vehicle shown in Fig. 1; and

Fig. 3 is a plan view illustrating a modification in the clutch or shifting mechanism, through which the driving power may be transmitted to the traction wheels through either one or the other train of gearing.

The conventionally illustrated portion of the vehicle embodies the main frame A having the usual front axle B, and the conventional portion of the power plant embodies the internal combustion engine shown at D, transmission gearing in the casing E, the Cardan or drive shaft F, and the usual rear axle differential gearing contained in the intermediate drive shaft housing G.

The other portion of the main frame, conveniently herein termed the supplemental frame, embodies diverging side frame members H, the rear ends of which at H' are preferably parallel and connected together rigidly by an angle or channel iron frame piece I. At their forward ends the frame members H extend parallel with and are preferably located below the main frame members A to which they are rigidly bolted so as to constitute therewith a rigid load supporting frame, the rear end of which is wider and on a somewhat lower plane than the plane of the part A of the frame. The rear load supporting axle K, preferably a centrally divided axle, with the proximate ends held within a central sleeve *k* is mounted in bearings L in the frame and at its ends carries the traction wheels M. Each traction wheel structure embodies, in addition to the rim, spokes and axle, a large internally toothed gear wheel N. A relatively small externally toothed gear wheel O is also connected with each of the traction wheels, being preferably mounted on the axle at the inner side of each traction wheel.

The intermediate drive shaft housing G is supported on the frame in a position forward of the axle K and the projecting ends P of this intermediate shaft lie in position for spur pinions mounted thereon to mesh with the internally toothed gear wheels for driving the traction wheels when the vehicle is used as a tractor. A further driving connection between the intermediate drive shaft and traction wheel for use when the vehicle is used as a truck embodies idler gear wheels Q preferably mounted on opposite ends of an idler shaft $q$ carried by the frame, said idler gear wheels being in mesh with the spur gears on the traction wheels and adapted to be connected with the sections of the intermediate drive shaft through pinions on the latter. As shown in Fig. 1, the same pinions S are adapted to be shifted on the squared ends of the intermediate drive shaft so as to mesh either with the internally toothed gear wheel, as shown in dotted lines in said Fig. 1, or with the idler spur gears Q, as shown in full lines in said Fig. 1, and these pinions are adapted to be simultaneously shifted from one position to the other by a shifting mechanism conveniently embodying a shift lever T in convenient reach of the driver, shifter rods $t$ extending from the lever T back to bell crank levers $t'$, and link connections $t^2$ extending from the bell crank levers to the usual collars adapted to move axially with the spur pinions, and to permit the latter to rotate in either position of adjustment.

Obviously, instead of shifting the spur pinion from one position to the other, two spur pinions may be employed, journaled on the intermediate drive shaft and a clutch of known construction provided for connecting either pinion with the intermediate drive shaft. Such an arrangement is shown in Fig. 3, wherein the spur pinions are indicated by $S'$, $S^2$, respectively, and the intermediate clutch collar by $S^3$, the operating connections for shifting the latter being similar to that described in connection with the pinion shifting arrangement shown in Fig. 1.

The axle and two transverse shafts mounted in the rear portion of the frame, together with the rigid frame itself constitutes a structure of great strength, well adapted to resist all strains which may be imposed on the vehicle by reason of its use either as a tractor or as a truck, and the advantage of being able to in effect transform the vehicle from a tractor into a truck and vice versa by a simple shifting of the driving connections is manifest. For example, as a tractor, the vehicle may proceed to its field of work as a truck at a speed which is commensurate with truck usage over ordinary highways, for example, and may be instantly converted into a tractor by shifting the driving connection to transmit the power to the traction wheels through the internally toothed gear wheels. Thus, a single vehicle may perform all the functions of both a tractor and a truck, and a farmer possessing a vehicle of this character is not under the necessity of adding or removing attachments such as have heretofore been necessary. Both trains of drive gearing are of a character the worth of which has been proven by practice, but which have never before been combined for the purposes herein stated. In the specific embodiment illustrated and described, the combined tractor truck vehicle may be developed with the use of the front wheels, frame, power plant and differential mechanism of an ordinary automobile and owing to the balance and character of the gearing employed in the driving mechanism added thereto, the power plant and gearing of the ordinary automobile are preserved and strains to be overcome thereby are not in excess of those for which the mechanism is designed.

What is claimed is:

1. In a tractor-truck motor vehicle, the combination with the running gear including the frame and traction wheels, of a driving mechanism embodying a power driven shaft, differential gearing, an intermediate shaft driven from the differential, and gearing between the intermediate shaft and traction wheels embodying an internally toothed gear wheel on each traction wheel, pinions on the intermediate shaft to mesh therewith, and a train of spur gears between the intermediate shaft and traction wheels with a shifting mechanism for effecting the drive of the traction wheels in the same direction through either the internally toothed gear wheel or the train of spur gears.

2. In a tractor-truck motor vehicle, a frame, a rear axle and traction wheels mounted thereon, in combination with a drive gearing embodying internally and externally toothed gear wheels connected with the traction wheels, a power driven intermediate shaft embodying a differential, and means for driving the traction wheels in the same direction from the intermediate shaft through either the internally or the externally toothed gear wheels to adapt the vehicle for use as a tractor or as a truck.

3. In a tractor-truck motor vehicle, the combination with the frame, rear axle traction wheels on the rear axle and intermediate power driven shaft embodying a differential, of internally and externally toothed gear wheels connected with the traction wheels, pinions on the intermediate shaft adapted to mesh with the internally toothed gear wheels, idler gear wheels between the intermediate shaft and externally toothed gear wheels on the traction wheels and manually controlled means for coupling said traction wheels with the intermediate shaft through either the internally or the externally toothed gear wheels and idler.

4. In a tractor-truck motor vehicle, the combination with the frame, rear axle, traction wheels on the rear axle and free to turn independently, a drive shaft, a sectional intermediate shaft and differential gearing between the drive shaft and sections of the intermediate shaft, of spur pinions on the intermediate shaft sections, internally toothed gear wheels on the traction wheels adapted to mesh with said spur pinions, externally toothed gear wheels connected with the traction wheels, idler gear wheels between the pinions on the said shaft and externally toothed gear wheels and shifting mechanism for changing the driving connections from the internally toothed to the externally toothed gear wheels and vice versa.

WILLIAM J. MILLER.

Copies of this patent may be obtained for five cents each, by addressing the "Commissioner of Patents. Washington, D. C."